US011627463B2

(12) United States Patent
Triest et al.

(10) Patent No.: US 11,627,463 B2
(45) Date of Patent: Apr. 11, 2023

(54) AUTHENTICATION VIA UNSTRUCTURED SUPPLEMENTARY SERVICE DATA

(71) Applicant: Critical Ideas, Inc., San Francisco, CA (US)

(72) Inventors: Patrick Nelson Triest, Brooklyn, NY (US); Maijid Moujaled, San Francisco, CA (US)

(73) Assignee: Critical Ideas, Inc., San Francisco, CA (US)

( * ) Notice: Subject to any disclaimer, the term of this patent is extended or adjusted under 35 U.S.C. 154(b) by 21 days.

(21) Appl. No.: 16/940,037

(22) Filed: Jul. 27, 2020

(65) Prior Publication Data

US 2021/0044975 A1 Feb. 11, 2021

Related U.S. Application Data

(60) Provisional application No. 62/885,083, filed on Aug. 9, 2019.

(51) Int. Cl.
*H04W 12/06* (2021.01)
*H04L 9/40* (2022.01)
(Continued)

(52) U.S. Cl.
CPC ....... *H04W 12/068* (2021.01); *H04L 63/0838* (2013.01); *H04L 63/0846* (2013.01);
(Continued)

(58) Field of Classification Search
CPC ............. H04L 63/0838; H04L 63/0846; H04L 63/0853; H04L 67/141; G06F 21/43;
(Continued)

(56) References Cited

U.S. PATENT DOCUMENTS 7,171,460 B2 * 1/2007 Kalavade ............ H04M 15/773 709/223
8,315,610 B2 * 11/2012 Hasemann .............. H04W 4/12 455/414.2

(Continued)

FOREIGN PATENT DOCUMENTS

| | | | | |
|---|---|---|---|---|
| CA | 2920518 A1 * | 4/2010 | ......... | G06Q 20/4014 |
| EP | 1208715 A1 * | 5/2002 | ......... | H04L 63/0853 |
| WO | WO-2013034865 A1 * | 3/2013 | ........... | H04L 9/3271 |

OTHER PUBLICATIONS

K. K. Lakshmi, H. Gupta and J. Ranjan, "USSD—Architecture analysis, security threats, issues and enhancements," 2017 International Conference on Infocom Technologies and Unmanned Systems (Trends and Future Directions) (ICTUS), 2017, pp. 798-802, doi: 10.1109/ICTUS.2017.8286115. (Year: 2017).*

(Continued)

*Primary Examiner* — Khalid M Almaghayreh
(74) *Attorney, Agent, or Firm* — Fenwick & West LLP

(57) ABSTRACT

A system and a method are disclosed for authenticating a user of a mobile device using Unstructured Supplementary Service Data ("USSD") protocol. The mobile device generates a One-Time Password ("OTP") code and sends that OTP code to a telecommunications server that forwards the content of the USSD message to the application server using an included short code. The OTP code is also sent out to the application server outside of the USSD protocol. When the application server receives both transmissions, the application server compares the OTP codes of these transmissions and determines whether the codes match. If the OTP codes match, the application server determines that authentication is successful and transmits an authentication token to the mobile device that is used to secure communications between the mobile device and the application server.

20 Claims, 8 Drawing Sheets

300

Mobile Device | Telecommunications Server | Application Server

302 — USSD Message
304 — USSD Acknowledgment
USSD Message Content — 306
308 — Authentication Request
Validate Authentication Request — 310
312 — Authentication Token
314 — Data Request (Authentication Token)
Validate Authentication Token — 316
318 — Requested Data

(51) Int. Cl.
*H04W 8/18* (2009.01)
*H04W 4/20* (2018.01)

(52) U.S. Cl.
CPC ........... *H04L 63/0853* (2013.01); *H04W 4/20* (2013.01); *H04W 8/18* (2013.01)

(58) Field of Classification Search
CPC ....... H04W 12/068; H04W 4/20; H04W 8/18; H04W 4/14; H04W 12/72
See application file for complete search history.

(56) References Cited

U.S. PATENT DOCUMENTS 8,583,496 B2 * 11/2013 Yoo ...................... G06Q 20/108 705/17
9,119,076 B1 * 8/2015 Gubbi ................. H04L 63/0853
10,708,742 B2 * 7/2020 Salihi .................. H04M 17/204
10,868,808 B1 * 12/2020 Hohler ................ H04L 63/0807
2003/0050081 A1 * 3/2003 Huber .................... G06Q 20/40 455/466
2009/0138563 A1 * 5/2009 Zhu ......................... H04W 4/14 709/206
2010/0081460 A1 * 4/2010 Knight ................ H04L 12/6418 455/461
2011/0249079 A1 * 10/2011 Santamaria ......... H04L 65/1006 348/14.02
2013/0166450 A1 * 6/2013 Pama ..................... G06Q 40/02 705/44
2013/0246276 A1 * 9/2013 Ooi ..................... H04W 12/068 705/44
2014/0379585 A1 * 12/2014 Buelloni ................ G06Q 20/34 705/76
2016/0127902 A1 * 5/2016 Ciarniello ............... H04L 63/18 380/247
2016/0132853 A1 * 5/2016 Kumar .................. G06Q 20/40 705/18
2016/0226862 A1 * 8/2016 Song ..................... H04L 9/3228
2016/0323269 A1 * 11/2016 Zaheer .................. H04L 63/123
2021/0234858 A1 * 7/2021 Nakagawa .......... H04L 63/0861

OTHER PUBLICATIONS

PCT International Search Report and Written Opinion. PCT Application No. PCT/US20/43744, dated Oct. 21, 2020, 18 pages.

Wikipedia, "Unstructured Supplementary Service Data," Date Unknown, two pages, [Online] [Retrieved on Sep. 3, 2020] Retrieved from the Internet <URL: https://en.wikipedia.org/wiki/Unstructured_Supplementary_Service_Data>.

* cited by examiner

AUTHENTICATION VIA UNSTRUCTURED SUPPLEMENTARY SERVICE DATA

CROSS REFERENCE TO RELATED APPLICATIONS

This application claims the benefit of U.S. Provisional Application No. 62/885,083, filed Aug. 9, 2019, which is incorporated by reference in its entirety.

TECHNICAL FIELD

The disclosure generally relates to the field of user authentication over electronic communication mediums.

BACKGROUND

Simple message service ("SMS") one-time-password ("OTP") authentication has become a popular method to authenticate users of mobile device such as smart phones, electronic tablets, and other devices connected over cellular and other similar networks. For example, when a user opens an application on a mobile device, the user may be prompted to supply a username and password, or the username and password may be automatically supplied by the mobile device. In addition, the application may attempt to authenticate the user by transmitting (e.g., over a cellular or another similar network) an OTP code to a telephone number associated with the mobile device previously registered by the user. In general, the user receives the OTP code via an SMS message on the mobile device and enters the OTP code into the application interface, thereby completing the authentication process. However, some physical geographic regions (e.g., remote areas, rural areas, less developed countries, and other areas of the globe) have resource constrained cellular networks (e.g., older generation infrastructures versus today's infrastructure that may be 4G or higher. In those regions, many SMS messages are not delivered or delivered with a long delay. Thus, this authentication system breaks down as the OTP is not received through the SMS within a timely window or simply not received at all.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
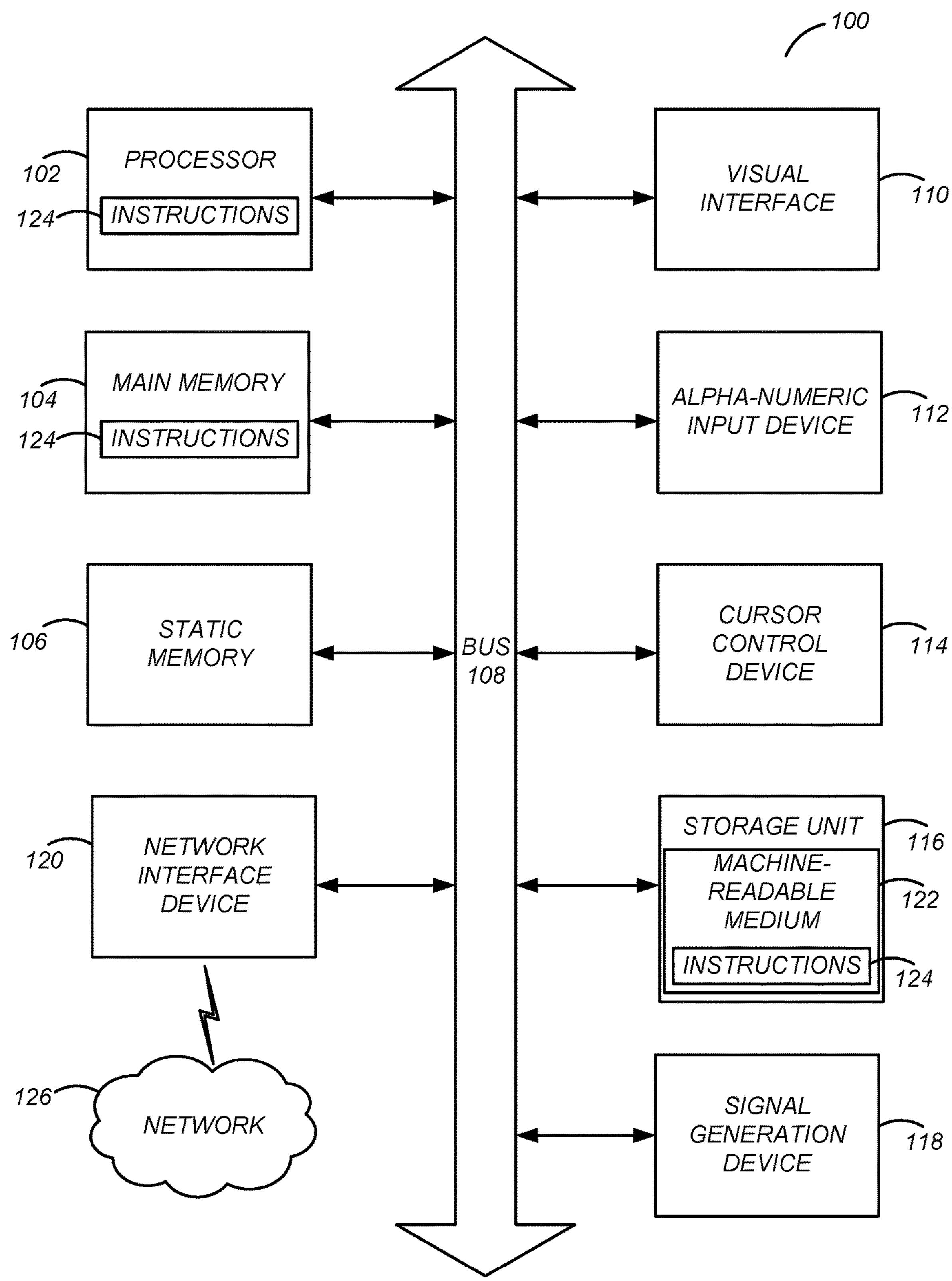
FIG. 1 is a block diagram illustrating components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a mechanism for authenticating a user in instances where short message service ("SMS") is unreliable or otherwise fails. Instead of using SMS for authentication, the disclosed mechanism may use Unstructured Supplementary Service Data ("USSD") protocol. USSD is a communications protocol that is sometimes referred to as quick codes or feature codes. USSD is used by cellular network providers to communicate data to and from mobile devices connected to cellular networks managed by the cellular network providers. Unlike the SMS authentication process, the disclosed authentication process may be initiated using the mobile device (e.g., instead of being initiated from the server that sends out the SMS). The mobile device may generate an OTP code that expires after a certain period of time (e.g., thirty minutes) and send that OTP code to a telecommunications server managed by a cellular network provider. The OTP code is included in a USSD message along with a telephone number associated with the mobile device and a short code that corresponds to an application server associated with the application that the user is attempting to access. The telecommunications server may forward the message to the application server based on the short code.

In addition, the application that the user is attempting to access may send out the OTP code to the application server, for example, through an Internet connection together with a telephone number that the user has registered with the application. This transmission of the OTP code does not use the USSD protocol. When the application server receives both transmissions may compare the OTP codes of these transmissions and determine whether the codes match. The application server may perform other checks (e.g., whether the OTP has timed out or not). If the OTP codes match, the application server may determine that authentication is successful and transmit an authentication token to the mobile device. The mobile device may use that authentication token to securely send and receive data between the mobile device and the application server.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which program code (e.g., software) for causing the machine to perform any one or more of the methodologies discussed herein may be executed. The program code may be comprised of instructions 124 executable by one or more processors 102. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include visual display interface 110. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 110 may include or may interface with a touch enabled screen. The computer system 100 may also include alphanumeric input device 112 (e.g., a keyboard or touch screen keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Environment

Figure 2:
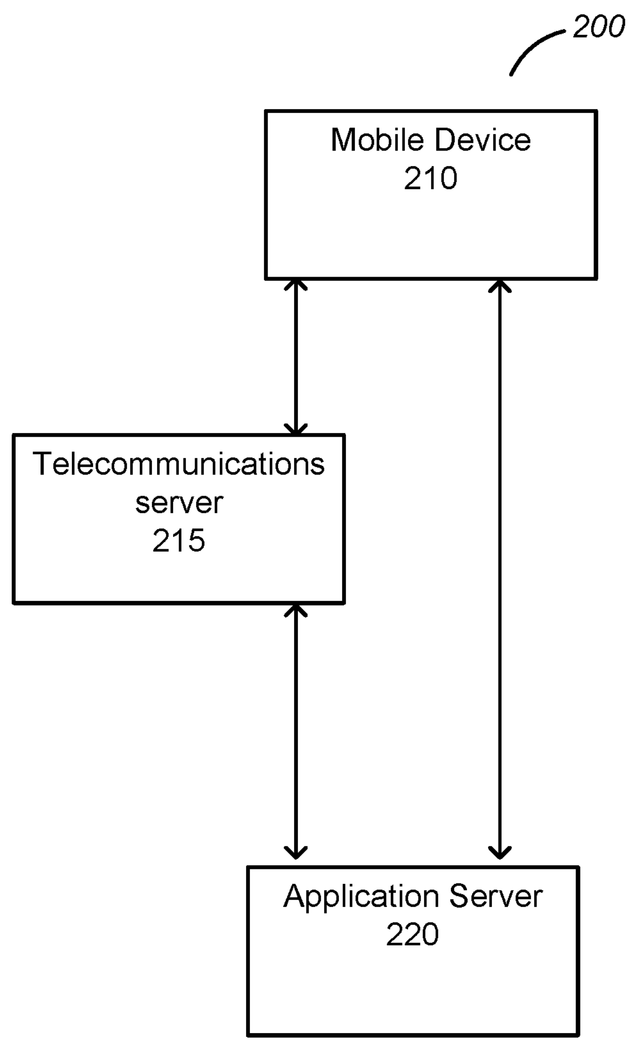
FIG. 2 illustrates a system for a user authentication, in accordance with some embodiments of this disclosure.

FIG. 2 illustrates a system for authenticating a user, in accordance with some example embodiments of this disclosure. FIG. 2 includes mobile device 210, telecommunications server 215, and application server 220. Mobile device 210 may be a smart phone, an electronic tablet, or another suitable device with a cellular or another similar network connection that is enabled for communications using the USSD protocol. Mobile device 210 may include one or more components shown in FIG. 1. For example, mobile device 210 may include processor 102, main memory 104, network interface device 120, visual interface 110, and/or other components of FIG. 1. Mobile device 210 may communicate with telecommunications server 215, for example, over the USSD protocol. Telecommunications server 215 may be a server device managed by a cellular network provider. Telecommunications server 215 may include processor 102, main memory 104, network interface device 120 and/or other components of FIG. 1.

Mobile device 210 may also communicate with application server 220. Application server 220 may be used to communicate application information to and from mobile device 210. Application information may be specific to the application that corresponds to application server 220. Other applications on the mobile device may communicate with other application servers (not shown). Application server 220 may include one or more components shown in FIG. 1. For example, application server 220 may include processor 102, main memory 104, network interface device 120, and/or other components of FIG. 1.

Communications Sequence

Figure 3:
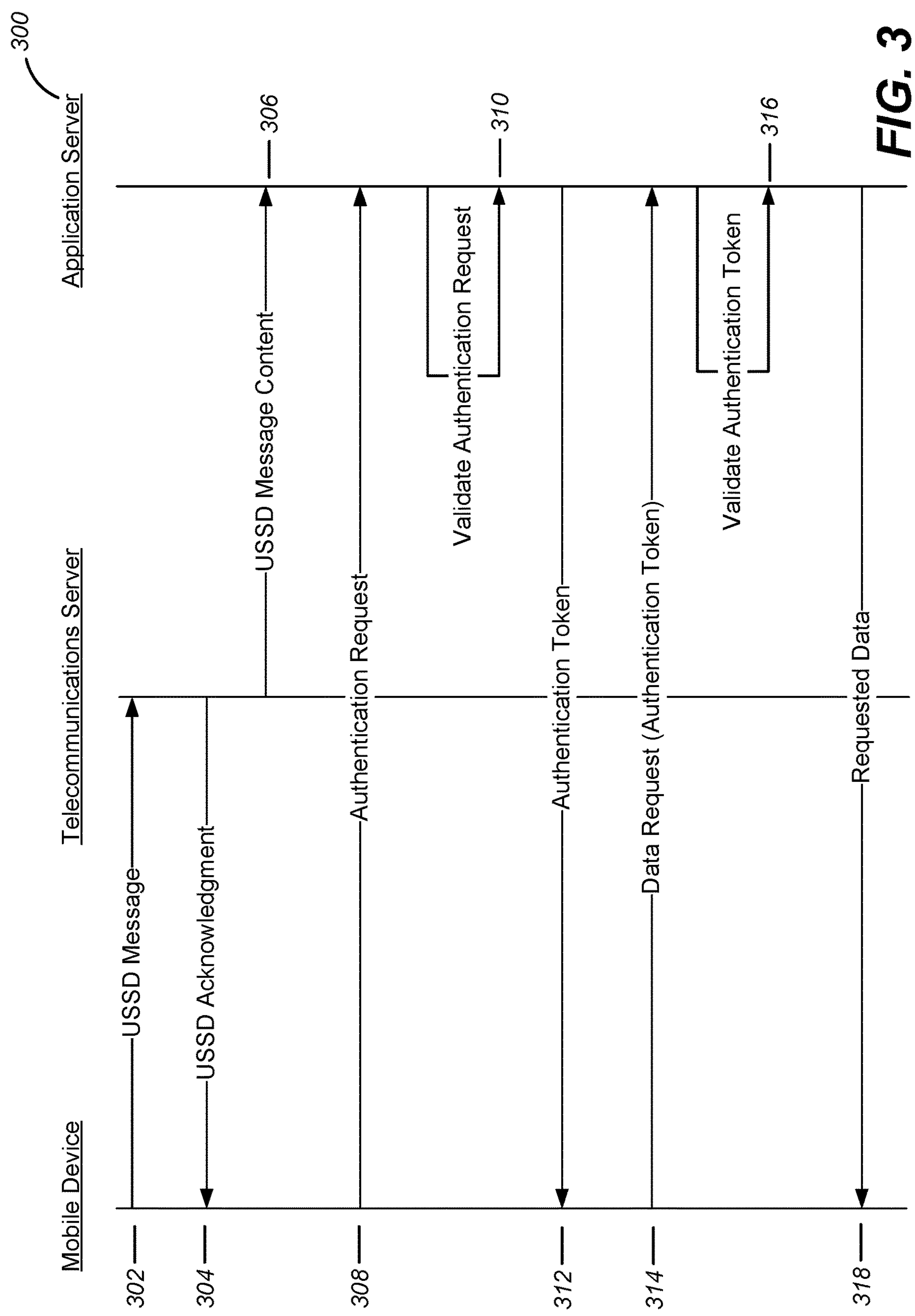
FIG. 3 illustrates a communication sequence, in accordance with some embodiments of this disclosure.

FIG. 3 illustrates a communication sequence between a mobile device (e.g., mobile device 210), a telecommunications server (e.g., telecommunications server 215), and an application server (e.g., application server 220), in accordance with some example embodiments of this disclosure. At 302, the mobile device transmits a USSD message to the telecommunications server. The USSD message may include an OTP code for authenticating an application, a short code corresponding to the application server and a telephone number associated with the mobile device. At 304, the telecommunications server sends a USSD acknowledgment to the mobile device indicating that the USSD message has been successfully received.

The telecommunications server upon receiving the USSD message may extract the short code from the USSD message and perform a lookup (e.g., in a forwarding table) fora server address associated with the short code. The server address may be an Internet Protocol ("IP") address associated with the application server. At 306, the telecommunications server transmits the USSD message content to the application server. The USSD message content may include the telephone number of the mobile device and the OTP code generated on the mobile device. The application server may store the OTP and the telephone number in, for example, a database on the application server or a separate database server (not shown). In some embodiments, the application server may store a timestamp of when the USSD message content was received.

At 308, the mobile device transmits an authentication request to the application server. For example, the mobile device may transmit the authentication request through an Internet connection on the mobile device. The authentication request may include the OTP code and a telephone number that was registered in the application. At 310, the application server validates the authentication request. The application server may compare the OTP code received as part of the USSD message content with the OTP code received in the authentication request. If the application server determines that the OTP code received as part of the USSD message content matches the OTP code received in the authentication request, the application server may determine that authentication has succeeded. If the OTP codes do not match, the application server may determine that authentication has failed, an transmit a failure message to the mobile device (not shown).

In some embodiments, the application server may also compare a timestamp of when the OTP was received with the current time. If the OTP was received within a predetermined amount of time, the application server may determine that authentication succeeded. That is, in these embodiments, for authentication to succeed both (1) the OTP codes have to match and (2) the OTP code received via USSD message has to have been received within the predetermined period of time. However, if the OTP codes do not match or the OTP code received via USSD message is not received within the predetermined period of time, authentication fails. If authentication fails, the application server may transmit a failure message to the mobile device (not shown).

In some embodiments, the application server may determine whether the OTP code has been previously used, and if the OTP code has not been previously used, the application server may determine that the authentication succeeded. That is, in these embodiments, for authentication to succeed both (1) the OTP codes have to match and (2) the OTP code received via USSD message has to not have been used previously. The application server may keep track of when an OTP code is used by, for example, storing a usage flag in a database. In these embodiments, if the OTP codes do not match or the OTP code received via USSD message has been previously used, authentication fails. If authentication fails, the application server may transmit a failure message to the mobile device (not shown).

At 312, the application server transmits an authentication token to the mobile device based on determining that authentication has succeeded. The token is transmitted to the mobile device to be used in further communications with the application server. For example, the token may be a JSON Web Token described as part of RFC 7519. Thus, at 314 the mobile device transmits a data request to the application server. The data request includes the token. The data request may be any type of application request, for example, a request for information from the application server. The application server may receive the data request and extract the authentication token from the data request. Based on determining that authentication has failed, the application server transmits a failure message to the mobile device. In response to receiving the failure message, the mobile device may attempt authentication again.

At 316, the application server validates the authentication token, and at 318, based on determining that the authentication token is valid, the application server transmit the requested data to the mobile device. The application server may determine the scope of the user's rights based on the permissions within the authentication token.

Mobile Device Actions

Figure 4:
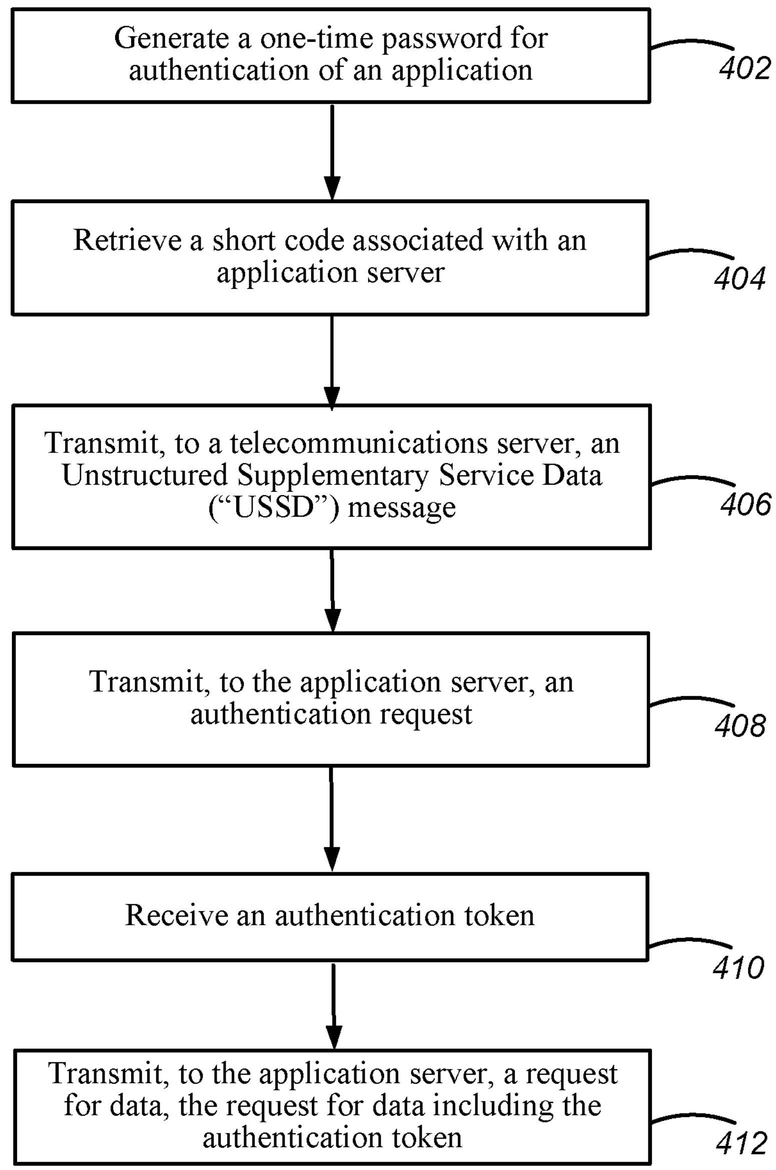
FIG. 4 illustrates a flow chart of actions for authenticating a user, in accordance with some embodiments of this disclosure.

FIG. 4 illustrates a flow chart for authenticating a user, in accordance with some example embodiments of this disclosure. Specifically, FIG. 4 illustrates the authentication process from the perspective of a mobile device. This process may be executed by the application that the user is attempting to access and/or by another process on the mobile device 210. If this process is executed by the application that the user is attempting to access, the application may need permissions to send data via the USSD protocol.

At 402, the mobile device 210 generates a one-time password for authentication of an application. The OTP code may be generated using a random number generator. The OTP code may include numbers, letters, or a combination of numbers and letters. In some embodiments, the OTP code may include four characters, six characters or another suitable number of characters.

At 404, the mobile device 210 retrieves a short code associated with an application server. For example, cellular network providers may store relationships between short codes and application servers. The relationship may be stored in a file and/or a database on, for example, the telecommunications server. In addition, if an application has a corresponding application server and a short code for that server, that application may store the short code in its allocated storage. The short code may be added during application install or at another suitable time. Thus, the application or another process on the mobile device may retrieve that short code.

Figure 6:
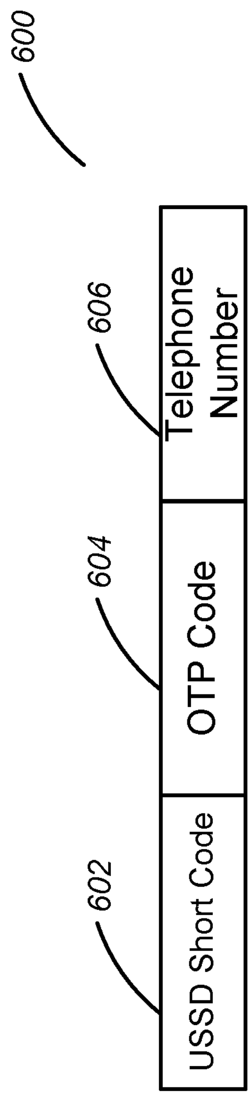
FIG. 6 illustrates a data structure for an Unstructured Supplementary Service Data ("USSD") message, in accordance with some embodiments of this disclosure.

At 406, the mobile device 210 transmits, to a telecommunications server, a USSD message. Turning briefly to FIG. 6, it illustrates an example data structure for a USSD message, in accordance with some embodiments of this disclosure. The USSD message may include a data structure 600 with USSD short code 602, OTP code 604, and a telephone number 606. For example, the USSD short code may be "*284*88*8*" and the OTP code may be "1234". The telecommunications server may transmit the content of the USSD message to the application server corresponding to the short code. For example, the telecommunications server may transmit a Hypertext Transfer Protocol ("HTTP") request to the application server with the OTP code and the telephone number.

Figure 7:
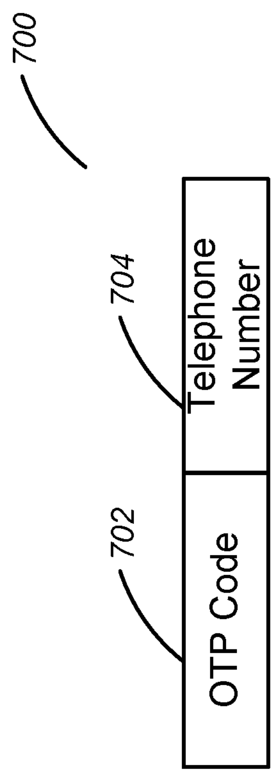
FIG. 7 illustrates a data structure for an authentication request, in accordance with some embodiments of this disclosure.

Returning to FIG. 4, at 408, the mobile device 210 transmits, to the application server 220, an authentication request. The mobile device 210 may transmit the authentication request through an Internet connection of the mobile device 210. Referring briefly to FIG. 7, it illustrates an example data structure that may be included in the authentication request. Data structure 700 may include OTP code 702 and telephone number 704.

Turning back to FIG. 4, at 410, the mobile device 210 receives an authentication token, responsive to the application service determining that authentication has been successful. The mobile device 210 may use the authentication token in secure communications with the application server 220. Thus, at 412, the mobile device 210 transmits, to the application server 220, a request for data, the request for data including the authentication token. The application server 220 may use the authentication token to authenticate the request for data.

Application Server Actions

Figure 5:
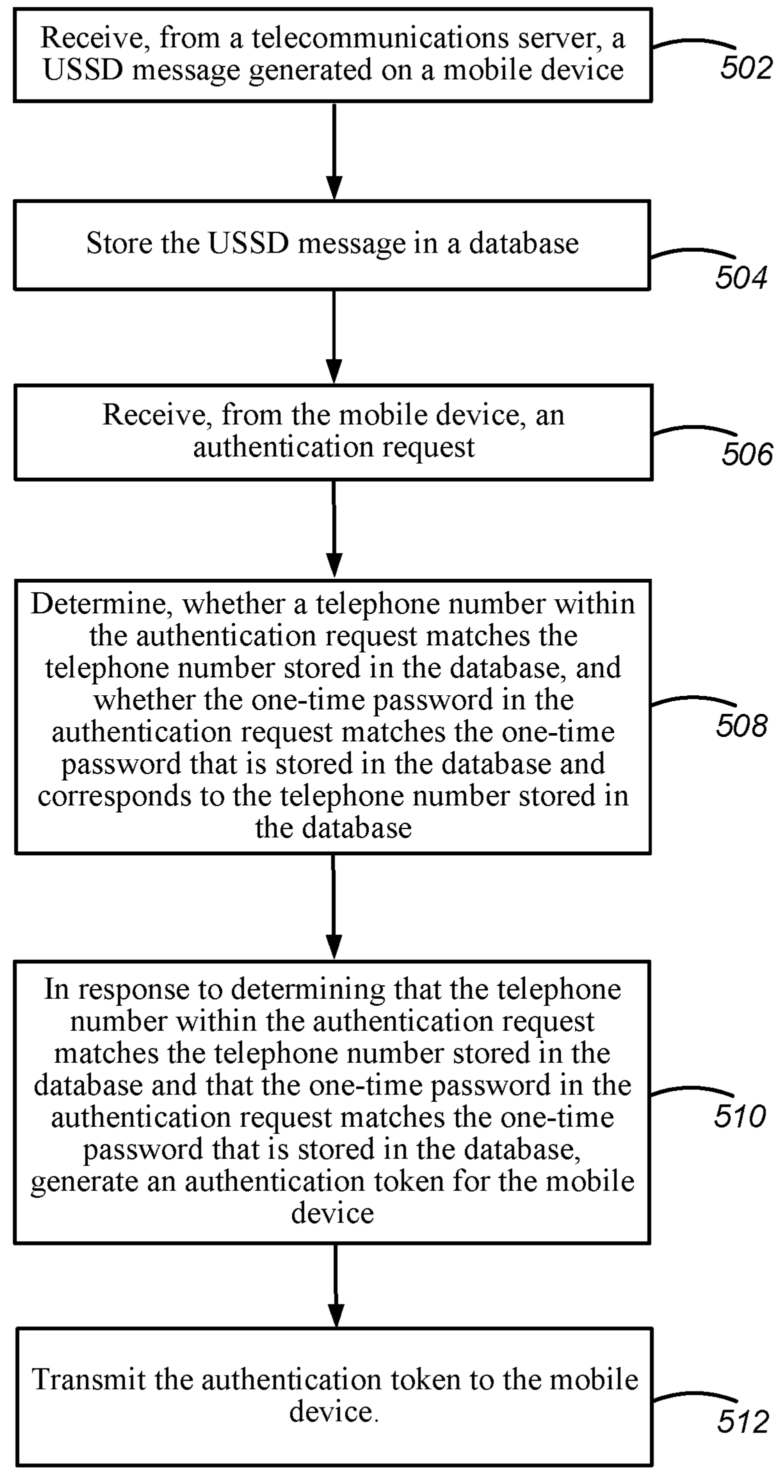
FIG. 5 illustrates another flow chart of actions for authenticating a user, in accordance with some embodiments of this disclosure.

FIG. 5 illustrates another flow chart for authenticating a user, in accordance with some example embodiments of this disclosure. Specifically, FIG. 5 illustrates the authentication process from the perspective of the application server 220. The application server 220 may execute a process or an application that may perform the described actions. At 502, the application server receives, from a telecommunications server, a USSD message generated on a mobile device. At 504, the application server 220 stores the USSD message in a database. The database may be hosted on the application server 220 or another server that is communicatively coupled (either logically or physically (wired or wireless)).

Figure 8:
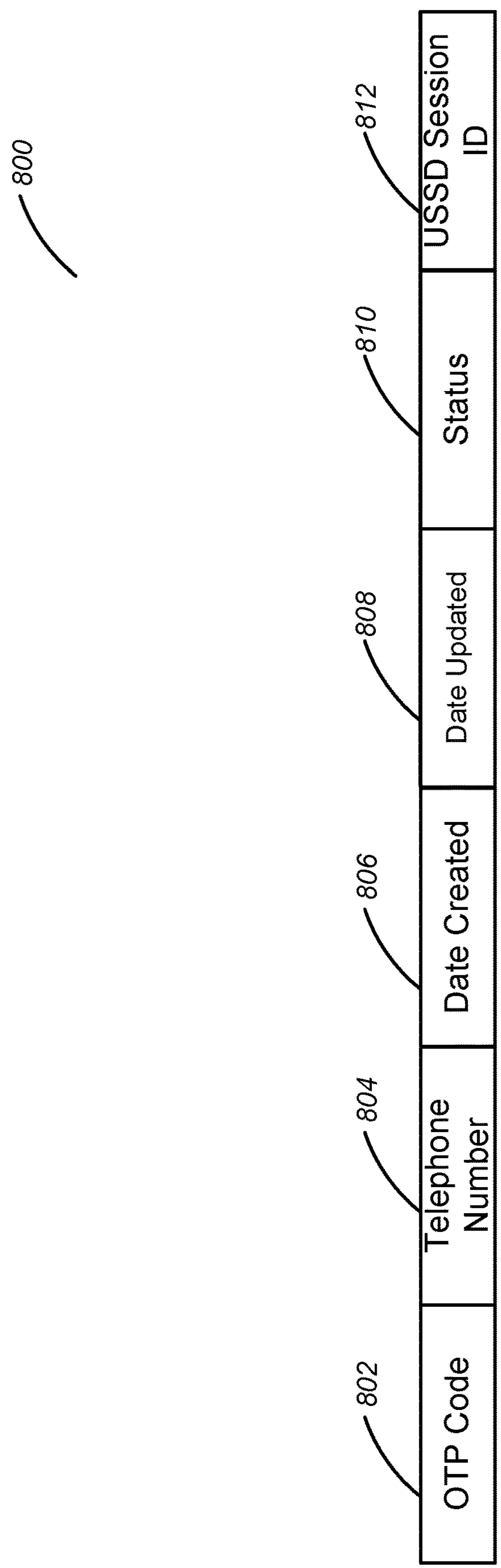
FIG. 8 illustrates a database entry, in accordance with some embodiments of this disclosure.

Turning briefly to FIG. 8, it illustrates an example database entry 800 for a received USSD message. Field 802 may store the OTP Code, field 804 may store the telephone number associated with a particular user and field 806 may store a creation date of the data base entry. Field 808 may store a date updated corresponding to a date and, in some embodiments, the time that the OTP code has been updated. Date updated field 808 may be updated every time a new OTP code is received via the USSD message. The updated time may be the time that the new OTP code was received. Field 810 may include the status of the entry. For example, a status may indicate whether the OTP code has been previously used. Status field 810 may be updated to indicate that the code has not been used every time a new USSD message content associated with the appropriate entry is stored. Status field may also be updated to indicate that the code has been used when a OTP code match is determined by the application server. Field 812 may include a USSD session id, corresponding to the identifier of the session that initiated the USSD message.

Returning to FIG. 5, at 506, the application server 220 receives, from the mobile device 210, an authentication request. The authentication request, as described above, may include a telephone number and an OTP code. At 508, the application server 220 determines, whether a telephone number within the authentication request matches the telephone number stored in the database, and whether the one-time password in the authentication request matches the one-time password that is stored in the database and corresponds to the telephone number stored in the database. For example, the application server 220 may retrieve the telephone number from the authentication request and generate a database query to retrieve an entry associated with the telephone number. The application server 220 may transmit the database query to a database engine, whether the database engine is hosted on the application server or at another server. The application server 220 (e.g., a process being executed on the application server) may receive the database entry and compare the OTP code received from the mobile device with the OTP code stored in the entry.

If an entry corresponding to the telephone number does not exist, the application server may receive an error or another similar indication. If no corresponding entry exists or the request otherwise fails, the application server may wait a predetermined amount of time and query the database again for updated information. That is, a possibility is contemplated that the short code or an update to the short code has not been inserted into the database yet.

At 510, the application server 220, in response to determining that the telephone number within the authentication request matches the telephone number stored in the database and that the one-time password in the authentication request matches the one-time password that is stored in the database, generates an authentication token for the mobile device. If the OTP codes do not match, the application server may generate a failure indication. If a failure indication is generated, the application server may transmit an authentication failure message to the mobile device.

In some embodiments, the application server 220 may compare the date updated field with the current date. If the date updated field does not match the current, the application server may generate a failure indication, even if the OTP codes match. In some embodiments, date updated field 808 may store a date and time, and the application server 220 may compare the date and time in the date updated field with the current date and time. If the application server 220 determines that the date and time in the date updated field is older than the current date and time by a predetermined amount, the application server may generate a failure indication. If the application server determines that the date and time in the date updated field is not older than the current date and time by the predetermined amount, the application server 220 may generate a success indication, based on the OTP codes matching as well. Based on the success indication, the application server 220 may generate an authentication token for the mobile device. If a failure indication is generated, the application server 220 may transmit an authentication failure message to the mobile device.

In some embodiments, the application server 220 may retrieve the content of status field 810 of the database entry 800 and determine whether the content indicates that the OTP code has been previously used or has not been previously used. If the content indicates that the OTP code has been previously used, the application server 220 may generate a failure indication for the authentication process. If the content indicates that the OTP code has not been previously used, the application server may generate a success indication based on the OTP codes matching as well. If a failure indication is generated, the application server may transmit an authentication failure message to the mobile device.

At 512, the application server 220, transmits the authentication token to the mobile device. That is, if the authentication is successful, the application server 220 transmits the authentication token to the mobile device 210.

Figure 9:
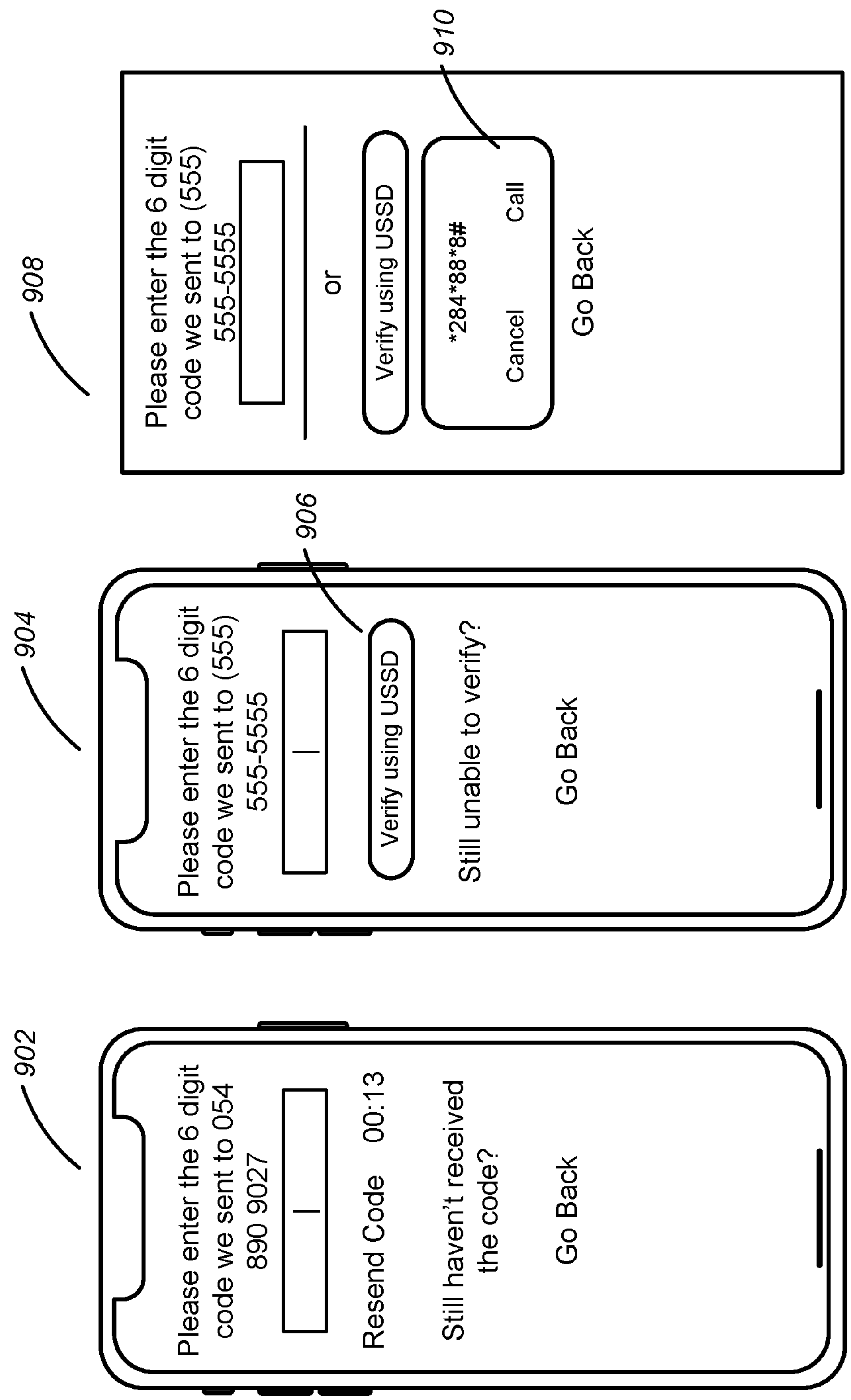
FIG. 9 illustrates mobile device user interfaces, in accordance with some embodiments of this disclosure.

In some embodiments, the USSD authentication described herein may be performed together with the SMS authentication. Referring to FIG. 9, it illustrates example mobile device 210 user interfaces in accordance with some embodiments of the current disclosure. User interface 902 illustrates a screen for authenticating the user via SMS. That is, when a user launches an application on the mobile device 210, the application may attempt SMS authentication. User interface 904 may be presented to the user so that the user may authenticate using USSD, based on the SMS message not being received or not being received within a predetermined period of time. The mobile device 210 may enable the user to select USSD authentication as shown in user interface 904. When the mobile device 210 receives a user selection of interface element 906, the mobile device 210 may attempt to automatically authenticate using USSD. That is, the application being authenticated may automatically retrieve the needed information and transmit the USSD message by calling the telecommunications server using USSD.

Some mobile devices do not give permissions to applications to perform USSD calls or permissions have not been granted otherwise. In those instances, the mobile device 210 may generate (or provide or enable) for display interface 908 where the mobile device may receive a use selection of interface element 910 instructing the mobile device 210 to perform the USSD call function.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for USSD authentication through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing authentication for mobile devices, the method comprising:

generating, on a mobile device, a one-time password for authentication of an application, wherein the one-time password expires after a first use or after a predetermined period of time;

retrieving a short code associated with an application server, wherein the application server corresponds to the application;

transmitting, to a telecommunications server, an Unstructured Supplementary Service Data ("USSD") message, wherein the USSD message comprises the one-time password, a telephone number associated with the mobile device, and the short code;

transmitting, to the application server, an authentication request, wherein the authentication request comprises the one-time password and the telephone number associated with the mobile device;

receiving, in response to determining that the telephone number, the one-time password, and a current date within the authentication request match a telephone number, a one-time password and an updated date in a database entry, an authentication token for the mobile device, wherein the authentication token maintains a connection for the mobile device and the application server to securely send and receive data; and transmitting, from the mobile device to the application server, a request for data, the request comprising the authentication token that is used by the application server to authenticate the request.

2. The method of claim 1, further comprising:

determining a number of telephone numbers associated with the mobile device;

enabling for display on the mobile device, in response to determining that more than one telephone number is associated with the mobile device, a prompt for selecting one of the telephone numbers to transmit to the telecommunications server.

3. The method of claim 1, wherein transmitting, the authentication request to the application server comprises transmitting a request for the authentication token.

4. The method of claim 1, wherein retrieving the short code associated with the application server comprises:

retrieving the telephone number associated with the mobile device;

determining, based on the telephone number associated with the mobile device a region associated with the mobile device; and selecting the short code based on the region associated with the mobile device.

5. The method of claim 1, further comprising receiving, in response to the authentication request being unsuccessful, a failure indication.

6. A method for authenticating mobile devices, the method comprising:

receiving, from a telecommunications server, a USSD message generated on a mobile device, wherein the USSD message comprises a one-time password and a telephone number associated with the mobile device, and a short code associated with an application server corresponding to an application;

storing a database entry in a database, wherein the database entry comprises a one-time password, a telephone number, and an updated date corresponding to a date when the one-time password was received in the USSD message;

receiving, from the mobile device, an authentication request, wherein the authentication request comprises the one-time password and the telephone number;

determining, whether 1) the telephone number within the authentication request matches the telephone number in the database entry, 2) the one-time password in the authentication request matches the one-time password in the database entry, and 3) a current date corresponding to when the authentication request was transmitted matches the updated date in the database entry; and generating, in response to determining that 1) the telephone number within the authentication request matches the telephone number in the database entry, 2) the one-time password in the authentication request matches the one-time password that in the database entry, and 3) the updated date in the database entry matches the current date, an authentication token for the mobile device, wherein the authentication token maintains a connection for the mobile device and the application server to securely send and receive data; and transmitting the authentication token to the mobile device, wherein the applications server receives requests for data from the mobile device, the requests for data comprising the authentication token.

7. The method of claim 6, wherein storing the database entry further comprises:

storing a timestamp for a time when the one-time password was generated; and storing a value in the database entry indicating whether the one-time password was used for authentication.

8. The method of claim 7, further comprising:

determining, based on the timestamp, whether the one-time password is expired, determining based on the value in the database entry, whether the one-time password has been already used; and in response to determining, based on the timestamp, that the one-time password is expired, or determining, based on the value in the database entry, that the one-time password has been already used, transmitting a response to the mobile device that authentication has failed.

9. A non-transitory computer readable storage medium comprising stored instructions, the instructions when executed by one or more processors cause the one or more processors to:

generate, on a mobile device, a one-time password for authentication of an application, wherein the one-time password expires after a first use or after a predetermined period of time;

retrieve a short code associated with an application server, wherein the application server corresponds to the application;

transmit, to a telecommunications server, an Unstructured Supplementary Service Data ("USSD") message, wherein the USSD message comprises the one-time password, a telephone number associated with the mobile device, and the short code;

transmit, to the application server, an authentication request, wherein the authentication request comprises the one-time password and the telephone number associated with the mobile device;

receive, in response to determining that the telephone number, the one-time password, and a current date within the authentication request match a telephone number, a one-time password and an updated date in a database entry, an authentication token for the mobile device, wherein the authentication token maintains a connection for the mobile device and the application server to securely send and receive data; and transmit, from the mobile device to the application server, a request for data, the request comprising the authentication token that is used by the application server to authenticate the request.

10. The non-transitory computer readable storage medium of claim 9, further comprising stored instructions that cause the one or more processors to:

determine a number of telephone numbers associated with the mobile device;

enable for display on the mobile device, in response to determining that more than one telephone number is associated with the mobile device, a prompt for selecting one of the telephone numbers to transmit to the telecommunications server.

11. The non-transitory computer readable storage medium of claim 9, wherein the instructions that cause the one or more processors to transmit the authentication request to the application server further comprises instructions that cause the one or more processors to transmit a request for the authentication token.

12. The non-transitory computer readable storage medium of claim 9, wherein the instructions that cause the one or more processors to retrieve the short code associated with the application server further comprises instructions that cause the one or more processors to:

retrieve the telephone number associated with the mobile device;

determine, based on the telephone number associated with the mobile device a region associated with the mobile device; and select the short code based on the region associated with the mobile device.

13. A non-transitory computer readable medium comprising stored instructions, the instructions when executed by one or more processors cause the one or more processors to:

receive, from a telecommunications server, a USSD message generated on a mobile device, wherein the USSD message comprises a one-time password and a telephone number associated with the mobile device, and a short code associated with an application server corresponding to an application;

store a database entry in a database, wherein the database entry comprises a one-time password, a telephone number, and an updated date corresponding to a date when the one-time password was received in the USSD message;

receive, from the mobile device, an authentication request, wherein the authentication request comprises the one-time password and the telephone number;

determine, whether 1) the telephone number within the authentication request matches the telephone number in the database entry, 2) the one-time password in the authentication request matches the one-time password in the database entry, and 3) a current date corresponding to when the authentication request was transmitted matches the updated date in the database entry; and generate, in response to determining that 1) the telephone number within the authentication request matches the telephone number in the database entry, 2) the one-time password in the authentication request matches the one-time password that in the database entry, and 3) the updated date in the database entry matches the current date, an authentication token for the mobile device, wherein the authentication token maintains a connection for the mobile device and the application server to securely send and receive data; and transmit the authentication token to the mobile device, wherein the applications server receives requests for data from the mobile device, the requests for data comprising the authentication token.

14. The non-transitory computer readable storage medium of claim 13, wherein the instructions that cause the one or more processors to store the database entry further comprises instructions that cause the one or more processors to:

store a timestamp for a time when the one-time password was generated; and store a value in the database entry indicating whether the one-time password was used for authentication.

15. The non-transitory computer readable storage of claim 14, further comprises stored instructions that cause the one or more processors to:

determine, based on the timestamp, whether the one-time password is expired, determining based on the value in the database entry whether the one-time password has been already used; and transmit, in response to the determination, based on the timestamp, that the one-time password is expired, or determination, based on the value in the database entry, that the one-time password has been already used, transmit a response to the mobile device that authentication has failed.

16. The non-transitory computer readable storage of claim 13, further comprises stored instructions that cause the processor to receive a failure indication in response to the authentication request being unsuccessful.

17. A system for providing authentication for mobile devices, the system comprising a mobile device configured to:

generate, on the mobile device, a one-time password for authentication of an application, wherein the one-time password expires after a first use or after a predetermined period of time;

retrieve a short code associated with an application server, wherein the application server corresponds to the application;

transmit, to a telecommunications server, an Unstructured Supplementary Service Data ("USSD") message, wherein the USSD message comprises the one-time password, a telephone number associated with the mobile device, and the short code;

transmit, to the application server, an authentication request, wherein the authentication request comprises the one-time password and the telephone number associated with the mobile device;

receive, in response to determining that the telephone number, the one-time password, and a current date within the authentication request match a telephone number, a one-time password and an updated date in a database entry, an authentication token for the mobile device, wherein the authentication token maintains a connection for the mobile device and the application server to securely send and receive data; and transmit, from the mobile device to the application server, a request for data, the request comprising the authentication token that is used by the application server to authenticate the request.

18. The system of claim 17, wherein the mobile device is further configured to:

determine a number of telephone numbers associated with the mobile device;

enable for display on the mobile device, in response to determining that more than one telephone number is associated with the mobile device, a prompt for selecting one of the telephone numbers to transmit to the telecommunications server.

19. A system for authenticating mobile devices, the system comprising an application server configured to:

receive, from a telecommunications server, a USSD message generated on a mobile device, wherein the USSD message comprises a one-time password and a telephone number associated with the mobile device, and a short code associated with an application server corresponding to an application;

storing a database entry in a database, wherein the database entry comprises a one-time password, a telephone number, and an updated date corresponding to a date when the one-time password was received in the USSD message;

receive, from the mobile device, an authentication request, wherein the authentication request comprises the one-time password and the telephone number;

determine, whether 1) the telephone number within the authentication request matches the telephone number in the database entry, 2) the one-time password in the authentication request matches the one-time password in the database entry, and 3) a current date corresponding to when the authentication request was transmitted matches the updated date in the database entry; and generate, in response to determining that 1) the telephone number within the authentication request matches the telephone number in the database entry, 2) the one-time password in the authentication request matches the one-time password that in the database entry, and 3) the updated date in the database entry matches the current date, an authentication token for the mobile device, wherein the authentication token maintains a connection for the mobile device and the application server to securely send and receive data; and transmitting the authentication token to the mobile device, wherein the applications server receives requests for data from the mobile device, the requests for data comprising the authentication token.

20. The system of claim 19, wherein storing the database entry further comprises:

storing a timestamp for a time when the one-time password was generated; and storing a value in the database entry indicating whether the one-time password was used for authentication.

* * * * *

UNITED STATES PATENT AND TRADEMARK OFFICE

CERTIFICATE OF CORRECTION

PATENT NO. : 11,627,463 B2
APPLICATION NO. : 16/940037
DATED : April 11, 2023
INVENTOR(S) : Triest et al.

It is certified that error appears in the above-identified patent and that said Letters Patent is hereby corrected as shown below:

In the Claims

In Column 12, Claim 4, Line 53, delete "device" and insert -- device, --, therefor.

In Column 13, Claim 8, Line 41, delete "determining" and insert -- determining, --, therefor.

In Column 14, Claim 12, Line 40, delete "device" and insert -- device, --, therefor.

In Column 14, Claim 13, Line 44, delete "medium" and insert -- storage medium --, therefor.

In Column 15, Claim 15, Line 23, delete "storage" and insert -- storage medium --, therefor.

In Column 15, Claim 15, Line 28, delete "determining" and insert -- determining, --, therefor.

In Column 15, Claim 15, Line 28, delete "entry" and insert -- entry, --, therefor.

In Column 15, Claim 16, Line 37, delete "storage" and insert -- storage medium --, therefor.

Signed and Sealed this
Seventeenth Day of October, 2023

Katherine Kelly Vidal

Katherine Kelly Vidal
*Director of the United States Patent and Trademark Office*